United States Patent [19]
Krafft

[11] Patent Number: 5,048,082
[45] Date of Patent: Sep. 10, 1991

[54] VOICE DIRECTION RECOGNITION IN A DIGITAL TELEPHONE STATION

[75] Inventor: Wolfgang Krafft, Munich, Fed. Rep. of Germany

[73] Assignee: Siemens Aktiengesellschaft, Munich, Fed. Rep. of Germany

[21] Appl. No.: 480,234

[22] Filed: Feb. 15, 1990

[30] Foreign Application Priority Data

Mar. 14, 1989 [DE] Fed. Rep. of Germany ....... 3908282

[51] Int. Cl.$^5$ .................................................. H04M 1/60
[52] U.S. Cl. ................................... 379/389; 379/406; 379/347; 379/409; 455/78
[58] Field of Search ............... 379/389, 399, 400, 390, 379/409, 406, 347; 370/32; 455/78, 79

[56] References Cited

U.S. PATENT DOCUMENTS

| | | | |
|---|---|---|---|
| 3,145,269 | 5/1962 | Gardner et al. | 379/409 X |
| 3,280,274 | 10/1963 | Schoeffler | 379/409 |
| 3,560,669 | 2/1971 | Foulkes | 379/409 |
| 3,754,105 | 8/1973 | Poschenrieder et al. | 379/409 |
| 3,953,676 | 4/1976 | Brown | 379/390 |
| 3,992,594 | 11/1976 | Helder | 379/389 X |
| 4,571,461 | 2/1986 | Uno et al. | 379/390 |
| 4,879,745 | 11/1989 | Arbel | 379/389 |

FOREIGN PATENT DOCUMENTS 501638  3/1978  Australia .

Primary Examiner—James L. Dwyer
Assistant Examiner—M. Shehata
Attorney, Agent, or Firm—Hill, Van Santen, Steadman & Simpson

[57] ABSTRACT

A method for controlling a voice-controlled voice direction recognition unit for a digital telephone station, which can be connected to termination units having different hybrid attenuations. The method prevents self-interruption in the transmission side due to an excessively low hybrid attenuation. This is achieved by providing a counter unit that identifies the switching occurrences of the voice direction recognition per time unit and, when a predetermined number is exceeded, that causes the voice direction recognition unit to connect an auxiliary attenuation element into every voice channel. The method can be utilized in digital telephone stations whose termination units are located in an appertaining switching system.

3 Claims, 1 Drawing Sheet

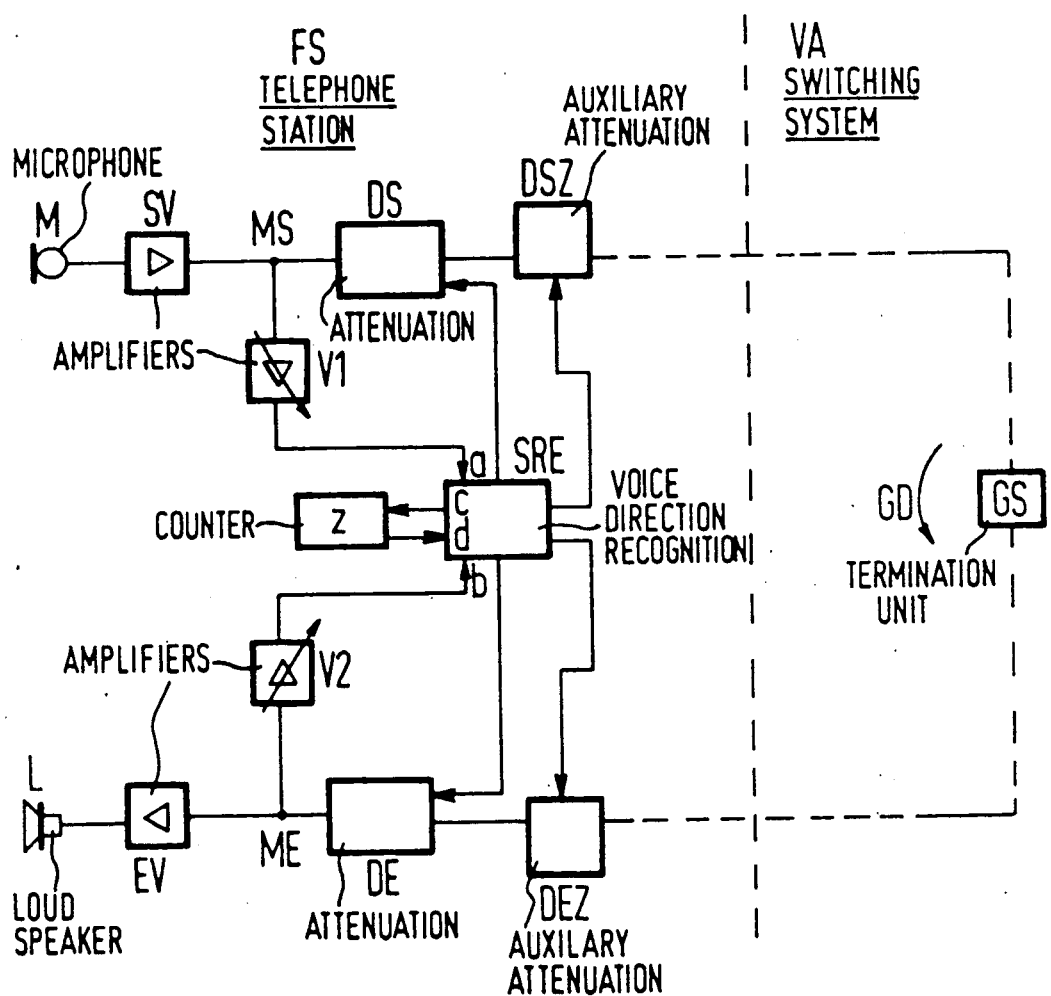

VOICE DIRECTION RECOGNITION IN A DIGITAL TELEPHONE STATION

BACKGROUND OF THE INVENTION

The present invention is directed to a method for controlling a voice-controlled direction recognition unit in a digital telephone station, whereby the voice direction recognition unit respectively controls a variable attenuation element in a transmission channel and in a reception channel in an inversely proportional attenuation ratio. A termination unit or hybrid circuit for the telephone station is connected to the telephone station for a connection to a further digital telephone station, to an analog telephone station or to a forwarding system in the appertaining switching system. Control voltages for the voice direction recognition unit are respectively taken from measuring points in the transmission channel and in the reception channel.

In digital telephone stations having hands-off operation, it is known to provide a respective, variable attenuation element or amplifier element in the transmission channel and in the reception channel, the element being controlled by a voice direction recognition unit (as disclosed for example in German Patent 27 14 132 hereby incorporated by reference). The attenuation is thereby reduced in the voice channel that is operational and the attenuation is simultaneously increased in the voice channel that is not being used. The absolute values of the increase and decrease of attenuation are the same to provide for circuit stability. The control voltages for the voice direction recognition unit are taken at a respective measuring point in the transmission channel and in the reception channel. In modern digital telephone stations, the termination unit is now no longer located in the station but is located in the associated switching system. The necessary termination unit is connected to the telephone station when setting up a telephone connection in accordance with the desired type of telephone connection (such as, digital subscriber, analog subscriber, or connection forwarded via a second exchange). Depending on the type of termination unit, the connected termination unit can have different values of attenuation. These values of attenuation vary, for example, from −6 dB through +6 dB. In the latter instance, this means that the signal in the transmission channel is amplified. This amplification can be so high that it generates a strong enough signal for the voice direction recognition unit via the attenuation element in the reception channel and at the measuring point in the reception channel that a switch-over to reception results. When only transmission signals are present from a microphone and have a speaking rhythm, a constant switching back and forth occurs that can only be suppressed with an additional attenuation in the voice channel. This attenuation, however, would have to be designed for the termination unit that has the highest amplification and the voice circuit would thereby be unfavorably designed for all other termination units.

SUMMARY OF THE INVENTION

An object of the present invention is to provide a variable auxiliary attenuation in a simple manner that can at least adequately adapt to the respect termination unit.

This is achieved in that the voice direction recognition unit reports every switch-over occurrence of the voice direction to a counter unit; in that the counter unit calculates the switching events per time unit; and in that the counter unit outputs a control signal to the voice direction recognition unit when a predetermined number of switching events per time unit is exceeded, this control signal causing the value of the attenuation of the attenuation element in the reception channel to be increased.

As a result, it is an advantage of the present invention that the voice direction recognition unit can recognize a connected termination unit having too little attenuation or with amplification and can connect a corresponding auxiliary attenuation.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing in which:

The single Figure essentially depicts the connection of a voice direction recognition unit SRE, attenuation elements DS and DE, amplifiers SV, EV, V1 and V2, a counter unit Z, a termination unit GS, a microphone M, a loud speaker L and auxiliary attenuation elements DSZ and DEZ.

DESCRIPTION OF THE PREFERRED EMBODIMENT

The present invention has general applicability, but is most advantageously utilized in a telephone station connected to a switching system such as depicted in the Figure.

The present invention is based on the subjective behavior of two persons engaging in a call. Normally, a change in voice direction in an ongoing call occurs on the order of one or more seconds. The normal conversation can thus definitely be distinguished from the case of interruptions occurring only at the transmission side. An interruption at the transmission side (rapid switching back and forth between the two statuses of transmitting and receiving) occurs when the signal sent in the microphone (transmission) channel is reflected via the termination unit into the reception channel to such a great degree that the voice direction recognition unit no longer recognizes it as the signal in the transmission channel but interprets it as a reception signal and initiates a switching for signal reception status. The rapid switching back and forth between the two statuses arises in that speech is not a constant signal and also arises due to transit time effects in digital networks.

The following defined attenuation curve when transmitting, given a connected termination unit GS with an attenuation of GD = −6 dB, shall be considered for the digital telephone station FS depicted in the Figure. Let a straight line attenuation of 0 dB to a maximum of −30 dB be assumed. The voice signal output by the microphone M proceeds via the attenuation element DS at the transmission side, that now has the attenuation value of 0 dB, to the termination unit or hybrid circuit GS which has −6 dB attenuation. Since the attenuation element DE in the reception channel likewise assumes the attenuation value of 0 dB due to the constant aggregate attenuation that is provided, the attenuation values of 0 dB and −6 db (hybrid attenuation) are transferred to the control inputs a and b of the voice direction recognition unit via the measuring points MS and ME. In this condition, an incoming reception signal must overcome the existing line attenuation (maximum of −30 dB) and the attenuation of −6 dB present at the voice direction recognition unit due to the attenuation of the hybrid circuit GD in order to cause a switching to reception. When switched to reception, the attenuation element DS assumes a maximum of −30 dB and the attenuation element DE assumes a maximum of +30 dB. Thus the voice direction recognition unit controls the attenuation elements DS and DE in an inversely proportional attenuation ratio. The auxiliary attenuation elements DSZ and DEZ have no function when this hybrid circuit is connected and self-interruption at the transmit side will not occur.

When, however, a call is set up wherein a hybrid gain of +6 dB is connected in the switching system VA, then, in the transmission operation considered above, a signal of about +6 dB via the attenuation element DE and the measuring point ME will briefly occur at the voice direction recognition unit SRE via the input b. As initially set forth, this signal sequence then leads to switchings from transmission to reception and vice versa that follow in relatively rapid succession. A counter means Z is connected to an output c of the voice direction recognition unit SRE, this counter means Z counting all switching occurrences of the voice direction recognition unit SRE per time unit. When a defined number of switching occurrences per time unit is exceeded, as will surely occur for a termination unit having an attenuation of +6 dB, the counter means Z outputs a corresponding signal to the input d of the voice direction recognition unit SRE and this connects in each voice channel an auxiliary attenuation element (DSZ and DEZ) of, for example, 0 through −12 dB.

In the status of transmission, the auxiliary attenuation element DSZ in the transmission channel has a value of 0 db and the attenuation element DEZ in the reception channel has a value of −12 dB. Since the attenuation element DE in the reception channel has the value of 0 db the voice direction recognition unit SRE must overcome an attenuation of −12 db to the input b for switching from transmission to reception. The switching event is thus stable.

In the reception status of the telephone station FS, the auxiliary attenuation element DSZ then assumes the value of −12 dB, whereas the auxiliary attenuation element DEZ assumes the attenuation value of 0 dB.

The indicated amplifiers SV, EV, V1 and V2 serve for individually setting the control circuit.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for controlling a voice-controlled voice direction recognition unit in a digital telephone station, the voice direction recognition unit controlling a variable attenuation element in a transmission channel and a variable attenuation element in a reception channel of the digital telephone station in an inversely proportional attenuation ratio, a termination unit in an appertaining switching system connecting the telephone station to another digital telephone station, to an analog telephone station or to a forwarding system, and control voltages for the voice direction recognition unit respectively taken from a measuring point in the transmission channel and from a measuring point in the reception channel, comprising the steps of: reporting from the voice direction recognition unit every switching occurrence of voice direction to a counter unit; calculating in the counter unit the switching occurrences per time unit; and outputting from the counter unit a control signal to the voice direction recognition unit for an upward transgression of a predetermined number of switching occurrences per time unit, said control signal causing at least the value of attenuation in the reception channel to be increased.

2. A method for controlling a voice-controlled voice direction recognition unit in a digital telephone station, the telephone station having a transmission channel with a first attenuation element and a reception channel with a second attenuation element, the voice direction recognition unit controlling the variable attenuation element in the transmission channel and the variable attenuation element in the reception channel in an inversely proportional attenuation ratio, a termination unit in an appertaining switching system being connected to the telephone station, comprising the steps of: providing first and second control voltages for the voice direction recognition unit from a first measuring point in the transmission channel and from a second measuring point in the reception channel, respectively; reporting by means of the voice direction recognition unit every switching occurrence of voice direction in the telephone station to a counter unit, the switching occurrence being determined from the first and second control voltages; calculating in the counter unit the number of switching occurrences per time unit; outputting a control signal from the counter unit to the voice direction recognition unit when the number of switching occurrences exceeds a predetermined number of switching occurrences per time unit, said control signal causing the voice direction recognition unit to at least increase the value of attenuation of the variable attenuation element in the reception channel.

3. The method according to claim 2, wherein the voice direction recognition unit, in response to the control signal, also causes the value of attenuation of the variable attenuation element in the transmission channel to decrease according to the inversely proportional attenuation ratio and the value of attenuation of the variable attenuation in the reception channel.

* * * * *